United States Patent [19]

Newton

[11] Patent Number: 4,662,777

[45] Date of Patent: May 5, 1987

[54] COMPOSITE ARTICLE

[76] Inventor: John R. Newton, Briar Bank, Endmoor, Kendal, Cumbria, LA8 0ED, United Kingdom

[21] Appl. No.: 673,803

[22] Filed: Nov. 21, 1984

[30] Foreign Application Priority Data

Nov. 26, 1983 [GB] United Kingdom ................. 8331632
Apr. 30, 1984 [GB] United Kingdom ................. 8410982

[51] Int. Cl.⁴ ................................................. E02D 29/14
[52] U.S. Cl. ..................................... 404/25; 428/117; 428/178; 52/20; 52/309.11; 52/799
[58] Field of Search ............... 404/22, 25, 26; 49/463, 49/501; 52/19, 20, 309.9, 309.11, 795, 799; 428/117, 178

[56] References Cited

U.S. PATENT DOCUMENTS

| 2,970,347 | 2/1961 | Massopust | 49/501 |
| 3,544,417 | 12/1970 | Corzine | 428/178 X |
| 3,672,103 | 6/1972 | Kost | 52/20 |
| 3,920,347 | 11/1975 | Sauriol et al. | 404/25 |
| 3,974,599 | 8/1976 | Grosh | 52/20 |

FOREIGN PATENT DOCUMENTS

| 251633 | 1/1967 | Austria | 52/799 |
| 342519 | 10/1976 | Austria | |
| 0031641 | 11/1980 | European Pat. Off. | |
| 2256164 | 5/1974 | Fed. Rep. of Germany | 52/799 |
| 1534693 | 8/1968 | France | 404/25 |
| 2420605 | 10/1979 | France | |
| 976103 | 11/1964 | United Kingdom | 404/25 |
| 1507331 | 2/1975 | United Kingdom | |
| 2049015 | 12/1980 | United Kingdom | 52/309.11 |

OTHER PUBLICATIONS

Fothergill Engineered Fabrics Ltd., "Preliminary Product Data on Admesh (M924), Nov. 1984".
Dr. Ing. R. Kleinholz et al., "Moulding with Mat Pre-Forms," *Vetrotex Fiberworld* No. 20, Jul. 1985.
British Standards Institution, "Specification for Manhole Covers, Road Gully Gratings and Frames for Drainage Purposes," BS 497:Part 1:1976.

*Primary Examiner*—James A. Leppink
*Assistant Examiner*—John F. Letchford
*Attorney, Agent, or Firm*—Workman, Nydegger & Jensen

[57] ABSTRACT

A composite cover 10 for a manhole or other opening comprises an upper 12 and lower 14 skin of glass reinforced plastics material. The upper and lower skins are bonded to one another about the edges 18 and spaced apart from one another therebetween to define a space 16 containing reinforcing walls 20 extending between the upper 12 and lower 14 skins. The reinforcing walls 20 are preferably formed from a corrugated sheet of glass fibre reinforced plastics material. The cover of the invention is as strong as conventional cast iron covers but is lighter and cheaper to manufacture.

9 Claims, 5 Drawing Figures

COMPOSITE ARTICLE

This invention relates to composite articles and in particular relates to composite load-bearing covers, such as man-hole covers.

Covers for man holes, underground storage tanks such as petrol storage tanks, delivery chutes to cellars or basement warehouses, and the like, have generally been made from iron or steel to provide the necessary load-bearing capacity to support vehicular traffic passing thereover. In order to provide the necessary structural rigidity, the thickness of metal employed must be relatively great and therefore the cost and the weight of such covers is high. Indeed, the cover for a filling station petrol storage tank may well weigh over a hundredweight (50 kg). Therefore removing and replacing such heavy covers is both difficult and hazardous for staff needing to gain access.

The invention seeks to provide an inexpensive and lightweight composite cover which nevertheless has the structural strength to replace the traditional iron or steel covers.

According to the present invention there is provided a composite cover which comprises a upper and lower skin of glass reinforced plastics material, the upper and lower skins being bonded to one another about the edges of the cover and spaced apart from one another therebetween, the space so formed containing reinforcing walls extending between the upper and lower skins.

The reinforcing walls may be in many different forms, e.g. the vertical portions of a continuous corrugated sheet, independant strips or ribs, or sections of tube. The supporting walls are preferably of a similar material to the upper and lower skins, that is glass reinforced plastics material, but need not be. For example, ribs of marine plywood can be employed as reinforcing walls. Whichever material and configuration is chosen for the reinforcing walls the factors to be borne in mind are the combination of adequate strength, lightness and economy. In the latter regard, it is possible to obtain a reinforcement of adequate strength by filling the space between the upper and lower skins with a suitable foamed plastics material, however materials suitable for this purpose and having sufficient strength are extremely expensive and such a composite would show little if any cost saving over traditional covers.

The preferred material for forming the upper and lower skins is glass fibre reinforced plastics material and this is normally formed in a suitable mould by laying up resin impregnated glass fibre cloth into the desired shape and allowing it to cure. The reinforcing walls are ideally made of the same material. Particularly preferred glass fibre cloth is that known by the designation Y702 Woven Roving (Industrial Reinforcements Limited/Fothergill & Harvey Limited). The resin employed is preferably a polyester resin such as Crystic 491PA or 272 (Scott-Bader Co. Ltd.) and a gel coat may be employed such as an isophthalic gel coat designated 65PA (Scott-Bader Co. Ltd), on the top surface of the upper skin to give abrasion resistance and weather-proofing.

A particularly advantageous way of producing the composite of the invention is by a method similar to the so-called 'Crenette process' developed by Fothergill & Harvey Ltd. In this method the glass fibre rovings are pre-formed with a thermosetting plastics material to render them coherent and stiff but still malleable. The composite of the invention can then be laid up in a mould with the bottom skin first, a corrugated sheet of glass fibre woven or knitted needled rovings with polyurethane foam infill pieces, and finally the top skin. The assembly is placed in an aluminium mould and resin is injected under pressure. The resin fully impregnates the glass fibre material and is kept out of the void spaces by the polyurethane infills. After curing the composite is removed as a solid integral unit. The above method of production is preferred to forming the upper and lower skins separately and bonding them together with the reinforcing walls sandwiched between, although this latter method can be used if desired.

The gelcoat may contain an antistatic agent and preferably is embossed with a non-slip pattern.

The outer edges of the cover are preferably sloped downwardly and contact the manhole frame at a correspondingly sloped part. Wear pads or surfaces may be formed on the underside of the edges to prevent wear in these highly stressed areas damaging the main construction. The wear pads may be built up with resin and glass fibre rovings at the time of moulding the composite and may even be re-moulded at a later date after a period of wear. Similarly, it is preferred to provide a pair of ribs or skids on the under-side of the bottom layer in a similar manner to take up the abrasion when cover is put on the ground and/or dragged about.

The invention will be described further, by way of example, with reference to the accompanying drawings in which.

Figure 1:
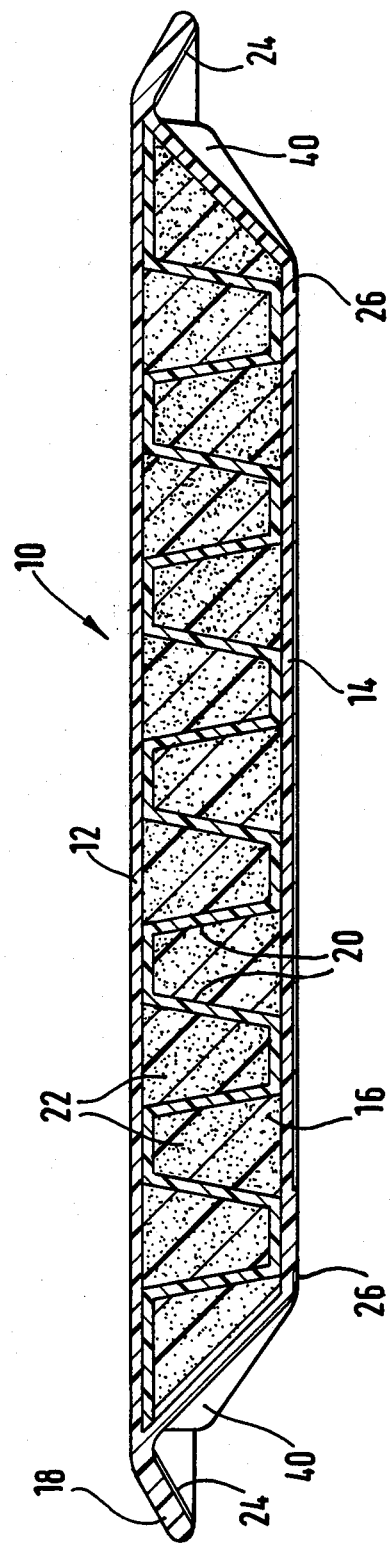
FIG. 1 is a sectional view of a petrol storage tank cover manufactured in accordance with the invention.

Referring to the drawings, a petrol storage tank filler opening cover generally designated 10 comprises upper and lower skins 12 and 14 formed of glass reinforced plastics material spaced apart to define a cavity 16 over the majority of the area, but bonded together or integrally formed to define edges 18. Within the cavity 16 reinforcing walls 20, being part of a corrugated sheet of glass reinforced plastics material, are bonded to or integrally formed with the inner faces of the upper and lower skins to provide additional strength and rigidity. In the voids between the walls 20 are shaped infills 22 of closed cell foamed polyurethane material.

Wear pads 24 are formed in situ on the under side of the edges 18; and wear skids 26 are similarly formed on the under face of the bottom skin 14.

Figure 2:
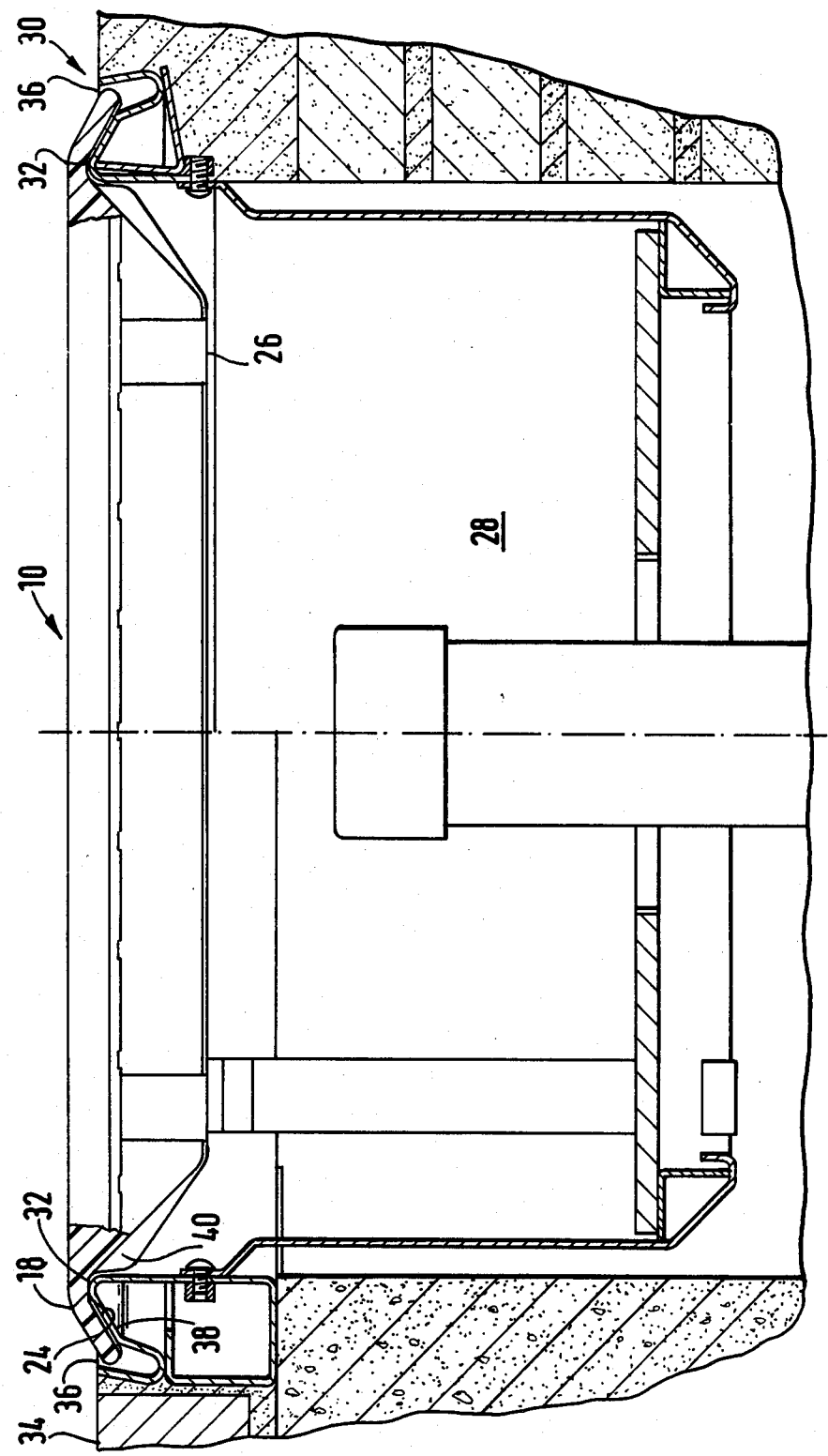
FIG. 2 is a side view partly in section of the cover of FIG. 1 in place.

FIG. 2 illustrates the cover 10 in place on a petrol filler pipe chamber generally designated 28. Chamber 28 has an upper frame 30 let into the ground about the chamber 28. In frame 2 the framework on the right hand side is illustrated set in concrete whereas that on the left hand side is illustratd suitable for use with ground formed from brick setts. In either case the rim 32 of the chamber is set above the general ground level 34 and, surrounding the rim 32 is a channel 36. The edge 18 is downwardly turned at its extremities and fits within the channel 36 on a correspondingly shaped surface 38 of the channel 30 thereby providing a water seal ensuring that rain or the like will not enter the chamber. The chamber 28 may be a conventional brick lined chamber or may be specially constructed chamber of glass reinforced plastics material set into the ground. A suitable chamber of the latter kind is described in UK patent No. 1602537.

The wear surfaces 24 on the underside of the edges 18 contact the portion 38 of the channel 30 and absorb the bulk of the wear of the cover 10. The pads 24 are designed so as not to be part of the integral structure of the top and bottom skins 12, 14 and so damage to the pads 24 does not affect the structure of the unit 10 as a whole. However, it has been found that the structure made as described hereinabove is so durable that minimal wear takes place even of the wear pads 24. Similar comments apply to the skids 26.

The cover 10 is up to 60% lighter than its conventional counterpart and can be lifted easily. Nevertheless, it meets all the relevant British Standards requirements for man hole covers and indeed exceeds them. Furthermore, the edge and channel arrangement provides a better water seal than hitherto available.

A guide portion 40 is provided which abuts closely against the inner side of the rim 32 of the channel 30. This serves two functions: firstly, it locates the manhole 10 within the opening without the extremity of the edge 18 banging into the channel 30; and secondly it serves to guide the cover when it is being removed and prevent it slipping sideways and falling into the opening.

The cover may be lifted by conventional means but it is preferred to use the key and keyhole arrangement as described hereinafter with reference to FIGS. 3 to 5.

Figure 3:
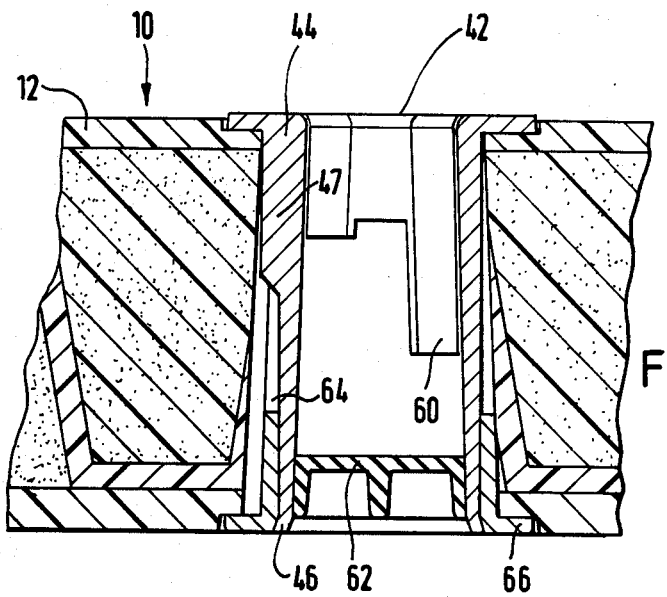
FIG. 3 is a partial sectional view of a keyhole.
Figure 4:
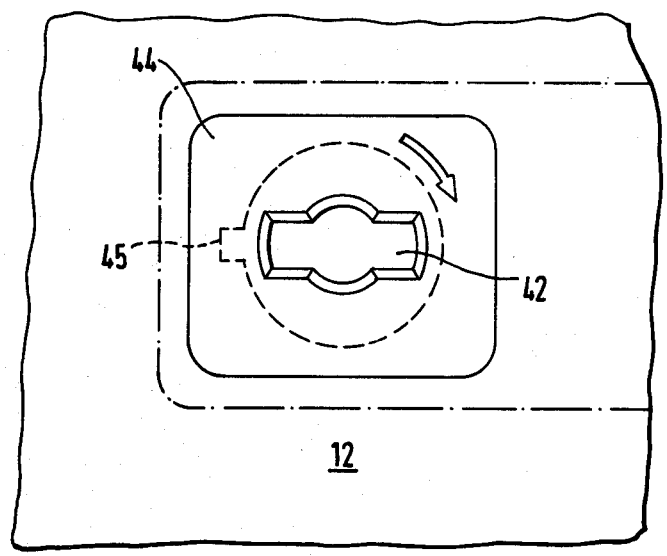
FIG. 4 is a partial plan view corresponding to FIG. 3.
Figure 5:
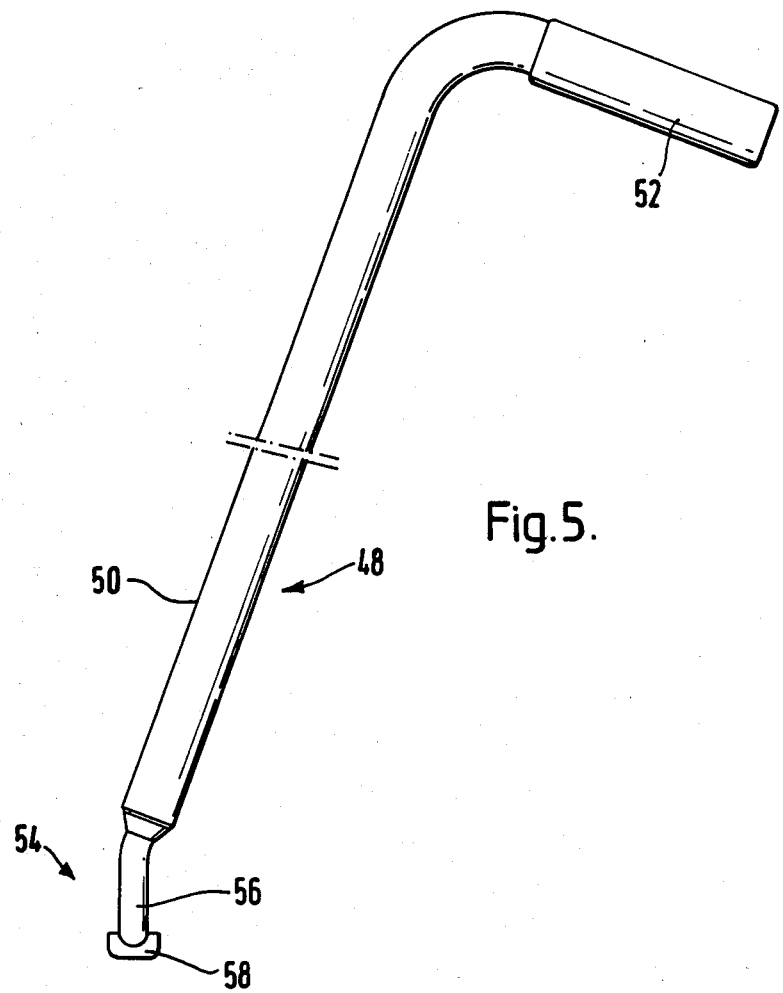
FIG. 5 is an elevational view of a key for use with the keyhole of FIGS. 3 and 4.

Referring now to FIGS. 3 to 5, to facilitate lifting of the cover keyholes 42 are provided at one or more suitable locations of the cover 10. The keyholes 42 are part of a keyhole housing 44 preferably formed of zinc-/aluminium alloy which has anti-spark properties. The housing 44 is located within the cover 10 as illustrated in FIG. 3 and is held in place by swaging the bottom end 46 as illustrated. However, should the housing 44 become corroded or otherwise unserviceable it can be knocked out and replaced with a fresh housing.

The keyhole is designed to be used with a key 48 comprising an elongate shaft 50 with a handle 52 the operative portion of which comprises a rod 56 and key portion 58. Portion 54 fits within the keyhole 42 when correctly aligned. Once inserted into the keyhole 42 the key is turned through approximately 90 degrees at which point key portion 58 contacts an abutment 60 preventing further rotation. Lifting the handle 52 causes the key to lock within the housing 44 enabling the operative to lift up and slide the cover 10 away from the manhole. The operator simply has to insert the key, turn through 90 degrees, lift, and walk backwards to remove the manhole from the opening. The length of the shaft 50 is such that no bending is reqired and the cover of the invention when used with the key and keyhole arrangement of the invention can be removed quite easily by women operatives.

A removable rubber bung 62 is provided in the base of the housing 44 so that accumulated debris can occasionally be removed.

The housing 44 is fitted to the cover 10 by forming a tapered hole 64 in the cover 10, inserting the housing from the narrower end, inserting a locking ring 66 into the wider end, and swaging the ends 46 on to the locking ring. As can be seen from FIG. 3 the housing is keyed into a keyway 45 by means of a projection 47 to hold it against rotation.

It can be seen that the invention provides a simple, strong and yet light-weight and inexpensive alternative to iron or steel manhole covers.

I claim:

1. A composite cover having high loadbearing capacity, comprising an upper and a lower skin of fiber reinforced thermosetting resin material, the upper and lower skins being integral with one another around the edges of the cover and spaced apart from one another therebetween, the space so formed containing reinforcing walls of fiber reinforced material extending between the upper and lower skins, the reinforcing walls being integral with the upper and lower skins where they contact the same, the voids between the reinforcing walls being filled with infills of plastic foam material, and the skins and reinforcing walls being resin impregnated so as to form one solid integral unit substantially free of joints or seams and the upper skin is provided with a gel coat which carries a non-slip pattern and has antistatic properties.

2. A cover as claimed in claim 1 wherein the fiber reinforcement comprises a glass fiber material.

3. A cover as claimed in claim 1 wherein the reinforcing walls comprise the vertical wall portions of a corrugated sheet of reinforcing material.

4. A cover as claimed in claim 1 wherein the infills are comprised of a closed celled polyurethane foam material.

5. A cover as claimed in claim 1 wherein the under surfaces of the edges of the cover are downwardly inclined and carry wear pads.

6. A cover as claimed in claim 1 further comprising guide portions formed on the cover to locate the cover in its opening and guide the cover when being removed.

7. A cover as claimed in claim 1 further comprising a keyhole formed in a housing fitted within the cover between the upper and lower skins, and a corresponding key having an elongate handle so as to reduce the need for bending when lifting the cover by means of the key inserted in the keyhole.

8. A cover as claimed in claim 7 wherein the keyhole housing comprises a metal casting removably inserted within a tapered hole formed in the cover locked in place by means of a sealed ring and swaged thereto.

9. A cover as claimed in claim 7 wherein the housing contains a stop abutment for the key so that the key may lock in its lifting position.

* * * * *

UNITED STATES PATENT AND TRADEMARK OFFICE
CERTIFICATE OF CORRECTION

PATENT NO. : 4,662,777
DATED : May 5, 1987
INVENTOR(S) : John R. Newton

It is certified that error appears in the above-identified patent and that said Letters Patent is hereby corrected as shown below:

```
Column 1, line 25, "a upper" should be --an upper--
Column 1, line 33, "independant" should be --independent--
Column 2, line 57, "frame 2" should be --FIG. 2--
Column 2, line 59, "illustratd" should be --illustrated--
Column 3, line 55, "reqired" should be --required--
```

Signed and Sealed this

Sixth Day of October, 1987

Attest:

DONALD J. QUIGG

*Attesting Officer*

*Commissioner of Patents and Trademarks*